No. 882,419. PATENTED MAR. 17, 1908.
W. H. RHODES.
AUTOMATIC POWER RELEASING DEVICE FOR DRAFT ENGINES.
APPLICATION FILED SEPT. 24, 1907.

Witnesses
Jos. H. Blackwood
A. J. Arnold

Inventor,
Wm. H. Rhodes,
By James K. Polk
Attorney

UNITED STATES PATENT OFFICE.

WILLIAM H. RHODES, OF BRANDENBURG, KENTUCKY, ASSIGNOR OF ONE-HALF TO GEORGE STORMS, OF LOUISVILLE, KENTUCKY.

AUTOMATIC POWER-RELEASING DEVICE FOR DRAFT-ENGINES.

No. 882,419.  Specification of Letters Patent.  Patented March 17, 1908.

Application filed September 24, 1907. Serial No. 394,329.

*To all whom it may concern:*

Be it known that I, WILLIAM H. RHODES, a citizen of the United States, and a resident of Brandenburg, in the county of Meade and State of Kentucky, have invented certain new and useful Improvements in Automatic Power-Releasing Devices for Draft-Engines, of which the following is a specification.

My invention relates to devices for automatically releasing the load from a horse power, traction, or other draft engine when it exceeds the capacity of the road grader or weight attached to the power, so as to prevent a break down of the engine or to weight, article, or substance proposed to be moved because of the engine being called upon to perform work beyond its capacity.

The construction, operation, and advantages of my device will be explained hereinafter and illustrated in the accompanying drawings, in which:—

Figure 1:
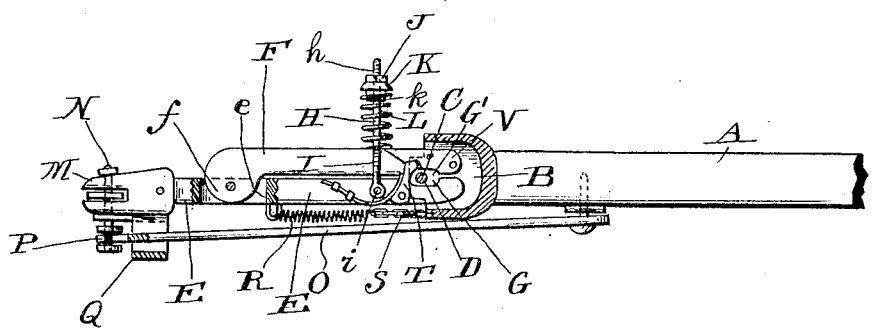
Figure 2:
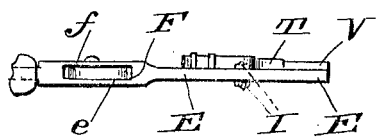
Figure 3:
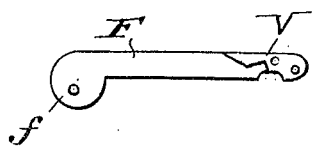

Figure 1 is a side view, partly in section, of my improved releasing device, showing it attached to a plow-beam; Fig. 2, a bottom view of the attaching jaws, and Fig. 3, a side view of the upper jaw on a smaller scale.

In the drawings similar reference characters indicate corresponding parts throughout the several views.

A indicates a plow-beam to which my improved device hereinafter described is attached, though instead of a plow any other agricultural or other draft machinery may be substituted, its draft-beam or pole, indicated by A, being provided with a draw-head B secured thereto having a coupling-pin C removably secured in holes D therein.

The draft device consists of an arm E having a recess e therein in which is pivotally secured the downwardly extending end f of another arm F. The free ends of arms E and F have mating recesses G G' therein, the arms E and F constituting a drawbar, the ends of which are inserted in drawhead B when the power engine is to be connected to the plowbeam A and the pin C, which is removed for the purpose, is inserted through the holes D in the drawhead and the hole formed by the mating recesses G G'.

The arms E and F are normally held together by means of a rod H, having bifurcated ends I straddling arm F and secured to the lower arm E, as shown at i, while its upper end is provided with a threaded portion h, on which is secured a nut J, a sleeve K slidably mounted on the rod having an annular shoulder k on its upper end, and a spring L mounted on the rod and with its two ends bearing against the top of arm F and the shoulder k. It will be understood that by regulating the tension of the spring L by adjusting nut J the two arms may be set so that a greater or less pull thereon, when attached to the drawhead B, as above described, will suffice to let the arm F swing so as to release the drawhead from the power-engine (not shown) attached to the drawhead M secured to the free arm E by means of pin N.

O indicates a bar pivotally secured to beam A and having its free end provided with a notch P that engages pin N when the beam A is coupled to the engine, as above described.

Q indicates a clip to guide the free end of the bar O so that it engages pin N.

R indicates a spring secured to the bottom of arm E and having a chain S secured thereto which is adapted to be attached to the beam A when the machine is hitched to draft animals so as to hold the whiffletrees by which they are hitched from dropping and striking their heels.

T indicates a spring-actuated pawl secured to E and V a projection on arm F to engage pawl T when the arms are spread in releasing the power, as above described, so that the ends of the arms will be held apart while the engine or other power is backed up to be again attached and the pin C will pass freely between the ends of arms E and F. When pin C strikes pawl T it is released from engagement with projection V so that the coupling is completed without requiring removal of the coupling pin C from the drawhead B as in the original coupling operation above described.

Having thus described my invention, what I claim is—

1. A draft-attaching device comprising spring-actuated arms, means to secure them to the load, and means to hold the arms apart when uncoupled from the load in position for recoupling, substantially as shown and described.

2. A draft-attaching device comprising spring-actuated arms, a drawhead secured to the load, a coupling-pin secured to the drawhead and engaging said arms, and means to hold the arms apart when uncoupled from the load in position for recoupling, substantially as shown and described.

3. A draft-attaching device comprising spring-actuated arms pivotally secured together and provided with mating recesses, a drawhead secured to the load, a coupling-pin secured to said drawhead and inserted through said recesses, and means to hold the arms apart when uncoupled from the load in position for recoupling, substantially as shown and described.

4. A draft-attaching device comprising an arm, another arm pivotally secured thereto, a rod having one end bifurcated and straddling the last mentioned arm and secured to the first mentioned arm, the upper end of said rod threaded, a set-nut mounted on said threaded end, a coil-spring on said rod and engaging said nut and the edge of the pivotally secured arm, and means to secure said attaching device to a load so that an excess of draft will cause said arms to swing apart against the tension of said coil-spring to release the load, substantially as shown and described.

5. A draft-attaching device comprising an arm, another arm pivotally secured thereto, said arms provided with mating recesses, a rod having one end bifurcated and straddling the last mentioned arm and secured to the first mentioned arm, the upper end of said rod threaded, a set-nut mounted on said threaded end, a coil-spring on said rod and engaging said nut and the edge of the pivotally secured arm, a beam secured to the load, a drawhead secured to said beam, and a coupling-pin secured to said drawhead and engaging the recesses in the arms aforesaid, substantially as shown and described.

6. A draft-attaching device comprising spring-actuated arms, means to secure said arms to the load, a projection on one arm, and a spring-actuated pawl on the other arm to engage said projection when the arms are released from the load to hold the arms in an extended position for recoupling with the load, substantially as shown and described.

7. A draft attaching device comprising spring-actuated arms, a drawhead secured to the load, a coupling-pin secured to the drawhead and engaging said arms, a projection on one of said arms, and a spring-actuated pawl on the other arm to engage said projection when the arms are released from the load to hold the arms in an extended position for recoupling with the load, said pawl when engaging said projection being in position to engage the coupling pin in recoupling, substantially as shown and described.

8. A draft attaching device comprising spring-actuated arms, pivotally secured together and provided with mating recesses, a drawhead secured to the load, a coupling pin secured to said drawhead, and inserted through said mating recesses, a projection on one of said arms, and a spring-actuated pawl on the other arm to engage said projection when the arms are released from the load to hold the arms in an extended position, said pawl when engaging said projection lying across the plane of said recesses to engage the coupling-pin in recoupling, substantially as shown and described.

9. A draft attaching device comprising a draft-beam having a drawhead attached thereto, a coupling-pin secured to said drawhead, spring-actuated arms pivotally secured together and provided with mating recesses to engage said coupling-pin, means to hold said arms extended when uncoupled from said pin, a drawhead secured to one of said arms, a coupling-pin secured to said drawhead to secure it to a draft appliance, and a bar pivotally secured to the draft beam and having its free end notched to engage said coupling-pin, substantially as shown and described.

In witness whereof, I have hereunto set my hand in presence of two subscribing witnesses.

WILLIAM H. RHODES.

Witnesses:
WILLIAM A. BASKETT,
JAMES B HOTTELL.